V. G. APPLE.
ARMATURE CONSTRUCTION FOR DYNAMO ELECTRIC MACHINES.
APPLICATION FILED JAN. 22, 1917.
1,275,195.
Patented Aug. 13, 1918.
5 SHEETS—SHEET 1.
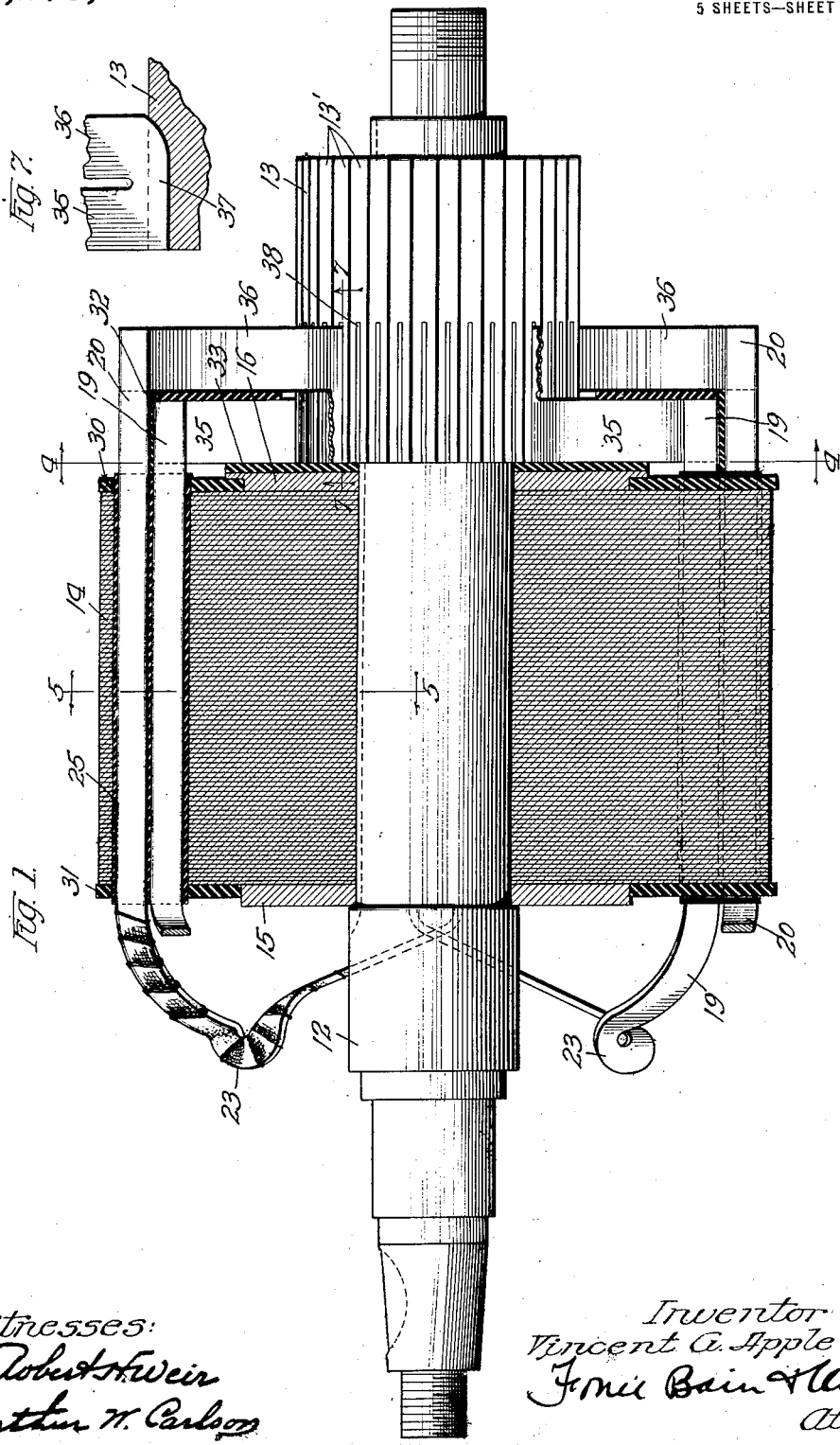

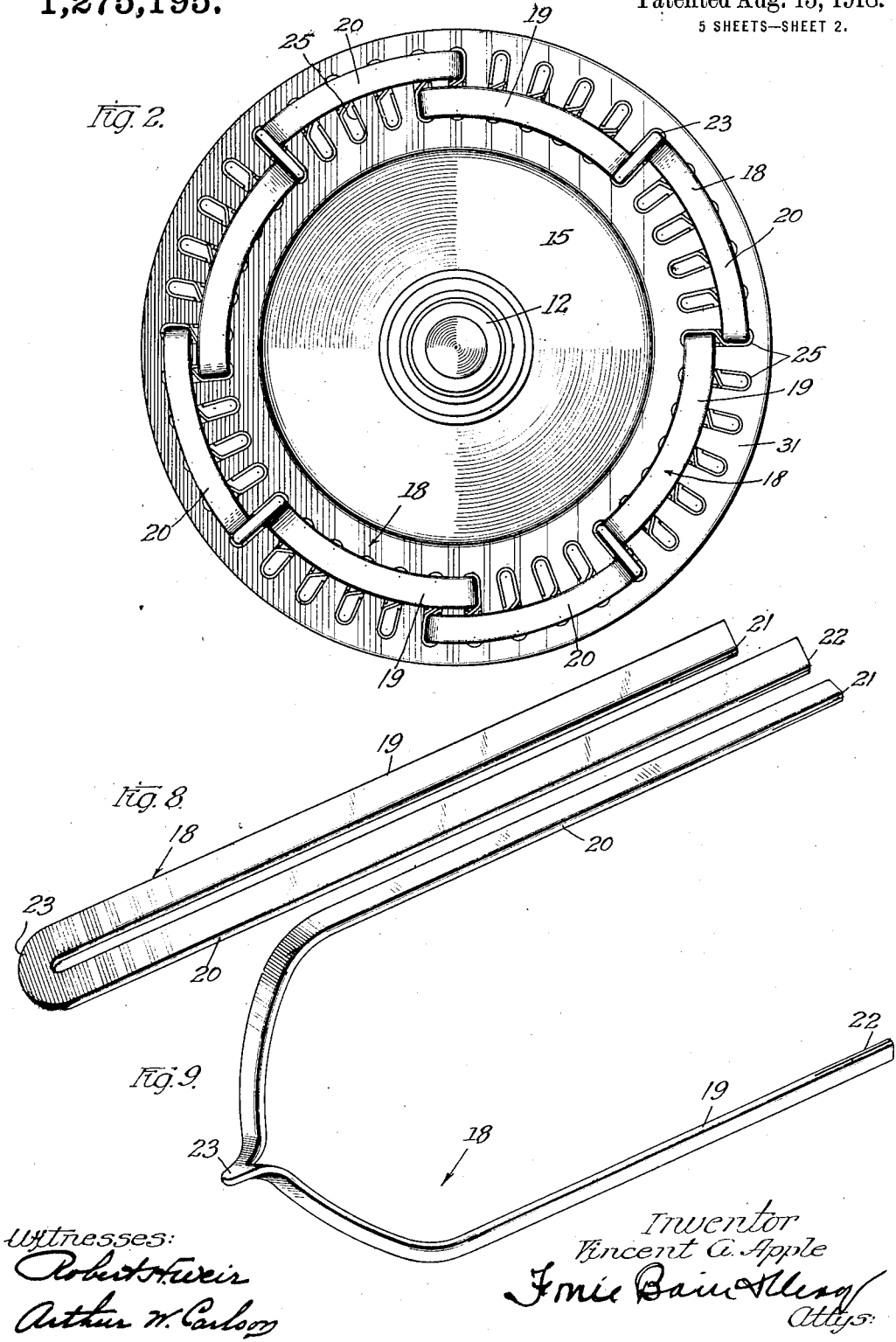

V. G. APPLE.
ARMATURE CONSTRUCTION FOR DYNAMO ELECTRIC MACHINES.
APPLICATION FILED JAN. 22, 1917.
1,275,195.
Patented Aug. 13, 1918.
5 SHEETS—SHEET 3.
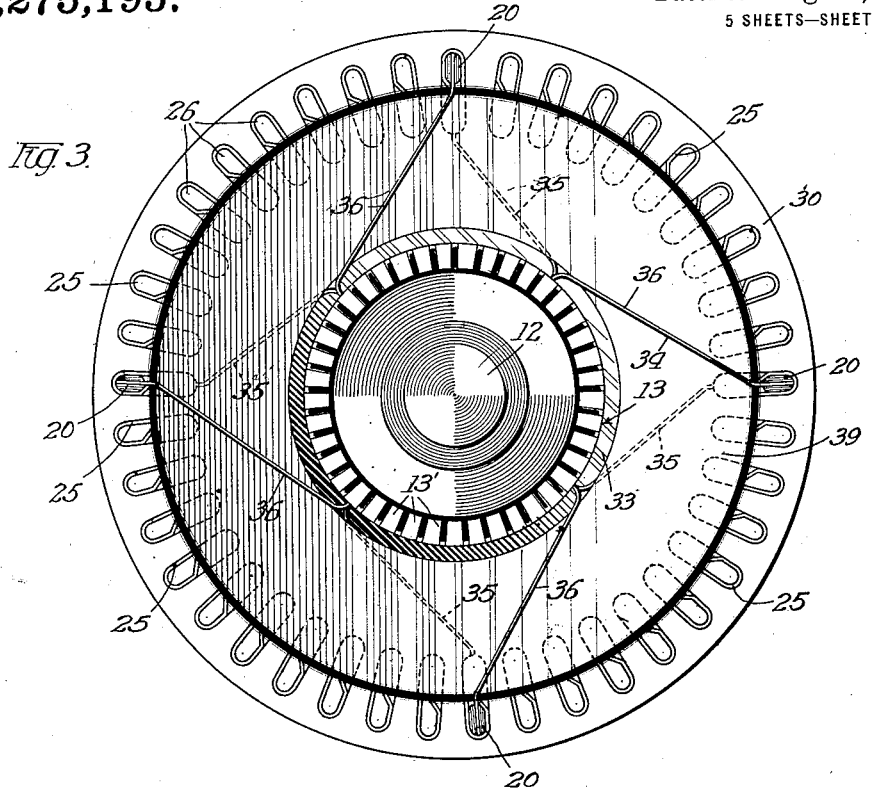
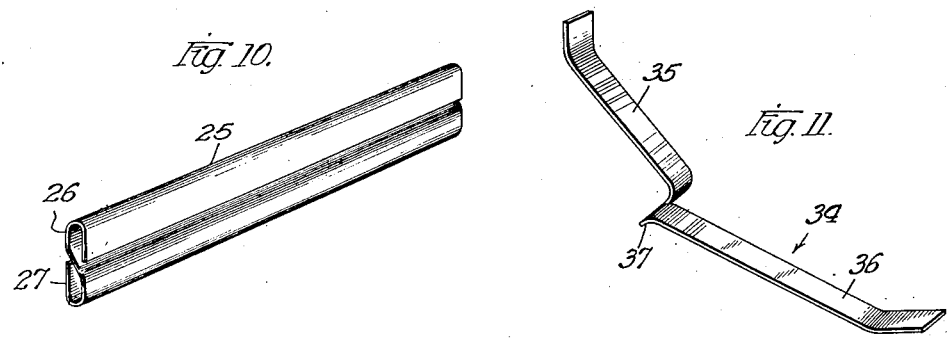

V. G. APPLE.
ARMATURE CONSTRUCTION FOR DYNAMO ELECTRIC MACHINES.
APPLICATION FILED JAN. 22, 1917.
1,275,195.
Patented Aug. 13, 1918.
5 SHEETS—SHEET 4.
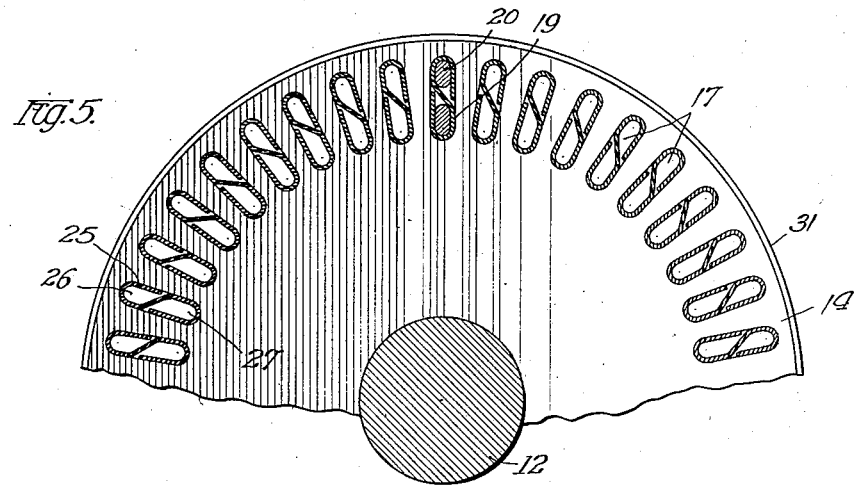
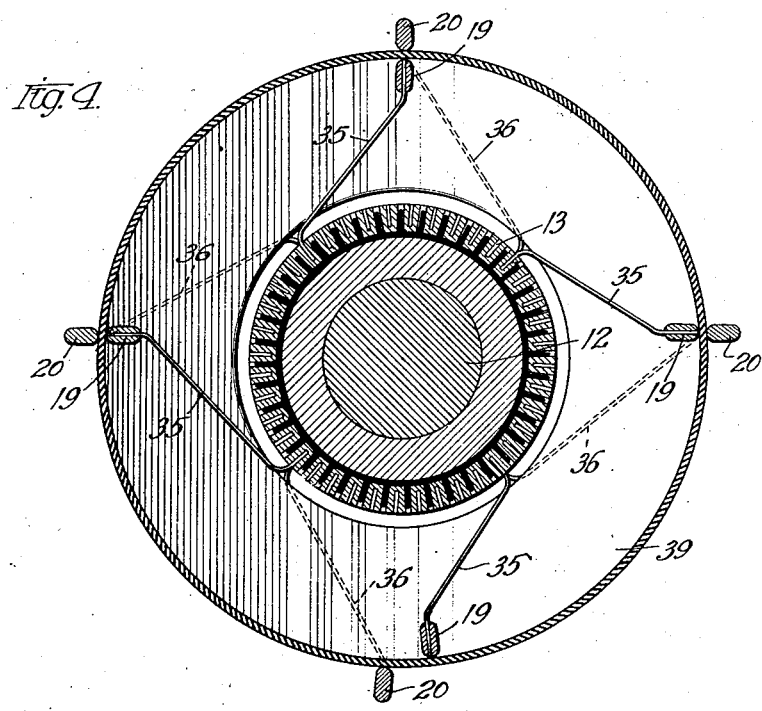

V. G. APPLE.
ARMATURE CONSTRUCTION FOR DYNAMO ELECTRIC MACHINES.
APPLICATION FILED JAN. 22, 1917.

1,275,195.

Patented Aug. 13, 1918.
5 SHEETS—SHEET 5.

Witnesses:
Robert F. Weir
Arthur W. Carlson

Inventor
Vincent G. Apple

UNITED STATES PATENT OFFICE.

VINCENT G. APPLE, OF DAYTON, OHIO.

ARMATURE CONSTRUCTION FOR DYNAMO-ELECTRIC MACHINES.

1,275,195.      Specification of Letters Patent.      Patented Aug. 13, 1918.

Original application filed November 19, 1914, Serial No. 872,959. Divided and this application filed January 22, 1917. Serial No. 143,832.

*To all whom it may concern:*

Be it known that I, VINCENT G. APPLE, a citizen of the United States, residing at Dayton, in the county of Montgomery and State of Ohio, have invented certain new and useful Improvements in Armature Constructions for Dynamo-Electric Machines, of which the following is a specification.

My invention relates to improvements in armature construction for dynamo electric machines.

One of the objects of my invention is to provide a new and useful armature which will be highly efficient in operation and sturdy and rugged in construction.

Another object of my invention is to generally improve armature structures.

Still other and further objects will become readily apparent to persons skilled in the art from a consideration of the following description when taken in conjunction with the drawings, wherein—

Figure 1 is a longitudinal central section through the armature core.

Fig. 2 is a rear end elevation, showing for the purpose of illustration four pairs of armature conductors in place.

Fig. 3 is a front elevation of the armature core.

Fig. 4 is a transverse section on line 4—4 of Fig. 1.

Fig. 5 is a transverse section on line 5—5 of Fig. 1.

Fig. 7 shows a fragment of the commutator and a part of the conductor for cross connecting the armature bars together and with the commutator.

Fig. 8 shows an armature conductor, such as a copper rod or bar, bent upon itself into hair pin form, prior to forming it into the wish bone shape shown in Fig. 9.

Fig. 9 shows a conductor in proper shape to be inserted within respective apertures in the armature core.

Fig. 10 is a perspective view of an insulating member for two adjacent conducting bars occupying the same aperture.

Fig. 11 is a perspective view of the commutator connector, a fragment of which is shown in Fig. 7.

Figure 6:
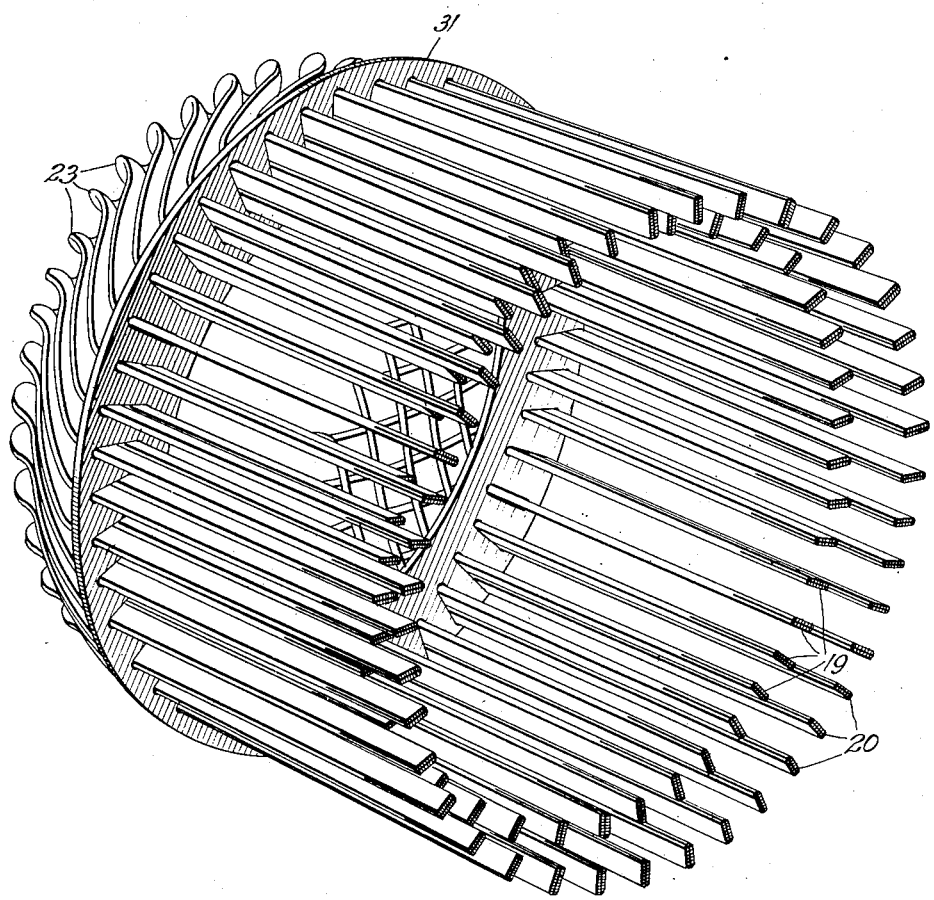
Fig. 6 shows the armature conductors stacked and positioned ready to be pushed into the axially extending perforations or apertures in the core.

This application is a division from my co-pending application, Serial No. 872,959 filed November 19, 1914, for a method of wiring armatures which application has resulted in Patent No. 1224518, granted May 1st, 1917.

In all the views the same reference characters are employed to indicate similar parts.

When a series of windings, each comprising a pair of integral conductors of a bar wound armature have heretofore been applied to an armature core, as when a pair of said conductors are made into the wish bone type, it has been required that the core have a smooth face or be provided with grooves between adjacent teeth, so that such formed conductors could be laid in place around the periphery of the core. In such a construction not any of the armature core intervenes between the conductor and the field magnet.

Prior to my invention, such integral plural bar form of conductors has not been applied to armature cores of the Wenstrom or Ironclad type, which are pierced axially, at frequent circumferential intervals, near the periphery for reception of the conductors. In such armatures, in which bar conductors have heretofore been used, one or more single bars have been placed in each perforation and separable connectors have been used at the ends of the bars to cross connect said straight bar conductors. Such a construction involves considerably more labor and introduces largely increased internal resistance, when compared with my method of procedure.

Some of the principal advantages of bar windings, generally, are reduction in the number of wires; ease of manipulation; the stability of the structures; the relatively low resistance; the more constant electro-motive force and relatively small internal loss. But these advantages are largely offset in the usual bar wound armatures where the conductors are directly presented and exposed to the magnetic field, by the induced eddy currents that are impressed upon each conductor bar. Such currents are never present, however, in ironclad armatures, wherein the conductor bars are placed within or embedded in the body part of a laminated core, as when they are included within the axial apertures near the periphery of the core.

My invention, therefore, provides a bar wound armature without the need of separable cross connections at the ends of the bars and in which the conductors are within closed apertures passing axially through the core, a structure that has previously been impossible of attainment within the teachings of the prior art.

In the single exemplification which I have chosen for the purpose of illustrating my invention, 12 is the usual armature shaft; 13 is the commutator thereon; 14 is the core comprised of a number of thin, soft iron, preferably insulated, disks held in place on the armature shaft by relatively heavier disks 15 and 16. The core is axially perforated at circumferential intervals, as at 17, said perforations being relatively wider in radial planes than in circumferential planes for the accommodation of the two conductors to be contained therein. Each conductor 18, is composed of a bar of metal such as copper, as shown in Fig. 8, first bent upon itself into two parallel limbs or legs 19 and 20 giving a general hairpin shape to the coil. The limb or leg 19 is shorter than the leg 20 and each of the legs is slit at its free end, as at 21 and 22, respectively. The conductor 18, after being bent in the form shown in Fig. 8, is subsequently bent into the form shown in Fig. 9. Each of the legs 19 and 20 are laterally deflected from the yoke portion of the structure 23, and each of the legs is bent so that the parallel surfaces through its longer transverse dimensions are radial to its axis or in radial planes corresponding with the slots in the armature core within which they are to be placed.

The conducting bars may conveniently be insulated in the apertures which they occupy by an insulating member 25, which may be made of a strip of fiber, or the like, bent into the shape resembling the figure 8, providing openings 26 and 27 for adjacent bars in the same slot. In Fig. 5, near the upper part of the transverse center of the figure, two conducting bars are shown in the openings 26 and 27 of the insulating member 25, and other insulating members are shown, in the apertures, in the same figure, ready for the reception of the conducting bars. This form of insulator provides an insulating wall between each conducting bar and the surrounding core, and also between adjacent conducting bars, in a one piece structure.

When it is desired to place the conductors in their respective apertures, within the core of the armature, the insulating members 25 are preferably first placed in the apertures in the core and the insulating ring 30, which also has perforations registering with those in the core, being held in place by the washer 16, but the insulating ring 31 is not in the position in which it is shown in Fig. 1 at this time. If preferred the insulating members may first be placed on the respective conducting bars before they are pushed into the apertures in the core.

The armature conductors or conducting bars necessary for a given armature, are now stacked or placed in nesting relation, as shown in Fig. 6, and the insulating ring 31 may then be placed over the conductors so as to position them in place substantially the same distance apart they will be when they are in the respective perforations in the armature core. The longer ends of the conductors are now inserted in the outer apertures 26 of the insulating member 25, which apertures are farthest removed from the center of the core and the entire number of conductors are pushed into the core from the rear end thereof until the shorter conductors 19 confront the apertures 27 in the insulating member. The entire number of conductors are now pushed into the core until they occupy the positions substantially as shown in Fig. 1, and the ring 31 is brought to its place. Each of the conductors is now surrounded by a fiber lining provided by the insulating member 25 and these members 25, pass entirely through the core and the insulating rings 30 and 31. An insulating ring 32, preferably of fiber, is now placed on the commutator end between the conductors 19 and 20, and another insulating ring 33, which is sufficiently large to pass over the end of the shaft 12 is placed in front of the washer 16.

The commutator connecting members 34, consist each of a strip of conducting material, preferably such as hard drawn copper, which is provided with two leaf members 35 and 36, joined together as at 37. The part 37, of each of these connectors, is inserted in a slot 38, made in each of the commutator bars 13', wherein it is soldered or brazed.

The short leaves 35 of the connector 34, are adapted to be secured in the slots 21 of the shorter conductor bars 19, and the longer leaves 36 of the connector are adapted to be secured in the slots 22 of the outer, longer arms 20' of the conductors. It will be observed that the leaves 35 of the connector are deflected in one direction and the leaves 36 are deflected in the opposite direction from the radial plane occupied by the connecting portion 37. Before the commutator 13 is placed in position on the armature all of the leaves 35 may be pressed in one direction, and the ring 39 slipped over the depressed leaves thereby to insulate the two conductors 35 and 36 from each other, or the ring may be split and slipped in place.

Before the commutator 13 with its connectors 34 is placed upon the shaft the connectors are bent in the respective positions so that they will register with the slots 21 and 22 made in the forward ends of the conductors 19 and 20 so that each of the ends 35 and 36 will register with its respective slot and will be easily entered therein when the commutator is pushed upon the shaft to its proper position.

After the leaves 35 and 36 of the connectors have been properly soldered to the respective conducting bars 20 and 29 the armature is ready for operation.

An armature made in accordance with my method of construction is practically indestructible; the space occupied by conductors at the ends of the core is relatively very small; and the time and labor required to place the conducting members in position in the core is substantially negligible.

The integral rear ends joining the conductor bars 19 and 20 may be taped or otherwise insulated, to prevent contact of the adjacent yokes, one with the other, as shown in Fig. 1.

While I have herein shown my invention applied to a four pole armature, it is evident that other forms of armature, having a greater or less number of poles, may be constructed in accordance with the said invention, and while I have disclosed one embodiment of my invention, it is manifest that departure may be made therefrom in the arrangement and disposition of the parts, within the scope of the appended claims.

Having described my invention, what I claim is:—

1. An armature comprising a core axially perforated at circumferentially spaced intervals, said perforations being open at their ends only; legs of wish-bone conductors in said perforations, said wish-bones each comprising two legs and a connecting yoke; a leg of each occupying the outer portion of a perforation and the other leg occupying the inner portion of another perforation, said legs and joining yoke of each wish-bone being one integral piece; the yoke of one pair of conductors of a wish-bone overlying the yoke of an adjacent pair of conductors at a given end of the armature uniformly throughout.

2. A bar wound armature comprising a core, perforated at intervals and a plurality of wish-bone loops, each loop comprising two conductor bars, and an integral connecting yoke, said bars extending through different perforations in the core and the yoke of one pair of conductors overlying the yoke of an adjacent pair of conductors uniformly throughout the armature structure.

In testimony whereof I hereunto set my hand.

VINCENT G. APPLE.